United States Patent Office 2,761,869
Patented Sept. 4, 1956

2,761,869

METHOD OF CONVERTING ALPHA ANGELICA LACTONE INTO BETA ANGELICA LACTONE

Reid H. Leonard, Pensacola, Fla., assignor to Newport Industries, Inc., Pensacola, Fla., a corporation of Delaware No Drawing. Application May 14, 1953,
Serial No. 355,172

5 Claims. (Cl. 260—343.6)

This invention relates to a method of converting alpha angelica lactone into beta angelica lactone, and more particularly to such conversion by the use of clays and the like.

In accordance with my present invention, alpha angelica lactone in vapor form is passed into contact with a natural decolorizing clay, an activated clay or other suitable earth or clay under such pressure and temperature conditions as to be converted into beta angelica lactone.

It is therefore an important object of this invention to provide a novel and improved method of converting alpha angelica lactone into beta angelica lactone.

Other and further important objects of my invention will become apparent from the following description and appended claims.

In carrying out the method of my invention, the vapors of alpha angelica lactone are led into contact with a natural or an activated clay. The clay can be a bentonite type of clay that has been acid-activated and dried or calcined to increase its activity. In general, however, natural decolorizing earths and clays, including high magnesia type clays, fuller's earth and the like, have been found suitable. All of these are herein generically referred to as decolorizing clay, since all have that common characteristic, or property.

The decolorizing clay is of any suitable mesh, viz. between 1 and 16, or it may be finer or coarser, but a bed of any finer mesh particle size tends to build up undue back pressure to the passage of the vapors through it, and with a coarser particle size, there may not be enough contact between vapor and earth to give high yields. The decolorizing clay can be in granular, extruded or pelletized form, but in any case is preferably of a mesh size between about 4 and 8. The depth of the bed can be varied considerably, but should be relatively deep to insure a long contact time.

The decolorizing clay is preferably heated to a temperature between 200 and 300° C., although temperatures as low as 150° and as high as 355° C. can be used with fair results. The time of contact will depend somewhat upon the temperature, the higher the temperature the shorter the time of contact to avoid formation of tars. The contact time can vary between 0.4 and 16 seconds and is preferably between 0.5 and 1.5 seconds. Depths of the bed of contact material can be varied depending upon the velocity rate of flow of the alpha angelica lactone to give contact times within the limits stated, but depths of 1 to 6 ft. are usually sufficient.

While the pressure can be varied considerably, better conversion of the alpha- into beta-angelica lactone is obtained from the use of sub-atmospheric pressures. If atmospheric or super-atmospheric pressures are used, there is a greater tendency to form undesirable by-products of a tarry nature, referred to collectively in the table given below as residual tar. Where lower pressures are used, as for instance in the neighborhood of 25 mm. Hg pressure, the percentage of residual tar is comparatively low. Preferably, therefore, the alpha angelica lactone vapors are passed through a bed of the activated earth under a pressure of between 10 and 30 mm. Hg pressure. If these relatively low pressures are employed, the rate of flow of the vapors through the bed becomes rather rapid, so that a deeper bed is indicated than with slower rates of flow so as to obtain the length of contact time with the activated earth that is required for good conversion.

The following example will serve to illustrate a preferred embodiment of my invention.

EXAMPLE

The activated earth used was a natural decolorizing clay, a fuller's earth, designated as Florex. 163 grams of dry, calcined, granular Florex of 4 to 8 mesh size was formed into a stationary bed, 25" in height. Through this bed were passed vapors of alpha angelica lactone generated in an evaporator initially charged with 1000 grams of the lactone, having an index of refraction, R. I. at 25° C., of 1.4456. The vapors were passed through the bed under a vacuum of 25 mm. Hg pressure for a period of 6.7 hours. During that period, a total of 754 grams of alpha lactone had been passed through the system and condensed. The refractive index of the recovered condensate at 25° C. was 1.4494. Upon vacuum fractional distillation under 25 mm. Hg pressure, a beta angelica lactone cut of 374 grams was obtained, representing a yield of 83% of the theoretical based upon the alpha angelica lactone started with less that which was recovered. The beta angelica lactone so produced had a boiling point of 104° C. at 25 mm. Hg absolute and a refractive index of 1.4530 at 25° C. This represented a purity of at least 90%.

The following table gives data with respect to a number of runs similar to that of the foregoing example but with varying temperatures and pressures of vapor passing through the decolorizing clay.

| Earth | | | | Pressure, mm. Hg | Contact time, sec. | Products | | | | Conversion to B, Percent | Yield B on theory, Percent |
| --- | --- | --- | --- | --- | --- | --- | --- | --- | --- | --- | --- |
| Source | Form | Size, mesh | Temp., ° C. | | | Alpha lactone, Percent | Beta lactone, Percent | Residual tar, Percent | Loss, Percent | | |
| Super Filtrol | Pellets | 4-8 | 250 | 760 | | 68.3 | 10.8 | 14.7 | 6.2 | 13 | 34 |
| Florex | Granules | 8-10 | 248 | 760 | 7.4 | 24.9 | 24.9 | 35.6 | 14.6 | 58 | 33 |
| Do | do | 4-8 | 255 | 760 | 8.6 | 27.6 | 29.3 | 24.0 | 19.1 | 55 | 41 |
| Calcined Florex | do | 4-8 | 247 | 760 | 16.0 | 16.5 | 26.6 | 36.3 | 20.3 | 75 | 32 |
| Do | do | 4-8 | 251 | 222 | 7.9 | 43.0 | 35.5 | 13.4 | 8.1 | 47 | 62 |
| Do | do | 4-8 | 254 | 29 | 1.0 | 57.1 | 34.2 | 4.9 | 3.8 | 45 | 80 |
| Do | do | 4-8 | 205 | 25 | 0.86 | 65.5 | 29.2 | 3.6 | 1.7 | 34 | 85 |
| Do | do | 4-8 | 355 | 26 | 1.05 | 50.1 | 38.3 | 5.0 | 6.6 | 51 | 77 |
| Do | do | 4-8 | 301 | 25 | 1.08 | 55.0 | 37.4 | 4.2 | 3.4 | 51 | 83 |

Super Filtrol is an acid activated bentonite type of clay.
Florex is a natural fuller's earth.

In figuring the yield of beta angelica lactone ("B" in the above table), the percentage of beta lactone recovered is divided by the percentage of alpha lactone not recovered, multiplied by 100. Thus from the figures in the top line of the table, the equation is:

$$\frac{10.8}{(100-68.3)} \times 100 = 34\%$$

It will be observed that with pressures around 25 to 30 mm. Hg, the best yields were obtained of beta angelica lactone, while much poorer yields were obtained at atmospheric pressure (760 mm.). The temperature appeared to have less effect on the yields than the pressures.

I claim as my invention:

1. The method of converting alpha angelica lactone into beta angelica lactone, which comprises passing the vapors of alpha angelica lactone into contact with a decolorizing clay while maintaining said vapors at a temperature of between 150 and 355° C. at a pressure of between 10 and 30 mm. Hg.

2. The method of converting alpha angelica lactone into beta angelica lactone, which comprises passing alpha lactone vapors at a pressure of 10 to 30 mm. Hg through a porous bed of fuller's earth at a temperature of between 150 and 355° C.

3. The method of converting alpha angelica lactone into beta angelica lactone, which comprises passing alpha lactone vapors at a pressure of 10 to 760 mm. Hg through a porous bed of fuller's earth at a temperature of between 150 and 355° C.

4. The method of converting alpha angelica lactone into beta angelica lactone, which comprises contacting vapors of alpha angelica lactone with a decolorizing clay at a temperature of between 200 and 300° C. and for periods of time varying between 0.5 and 1.5 seconds and under pressures between 10 and 30 mm. Hg pressure.

5. The method of converting alpha angelica lactone into beta angelica lactone, which comprises contacting vapors of alpha angelica lactone at a temperature of between 200 and 300° C. with a decolorizing clay of a particle size between 4 and 8 mesh for periods of time varying beteween 0.5 and 1.5 seconds and under pressures between 10 and 30 mm. Hg pressure.

References Cited in the file of this patent

Wolff: Annalen 229, pp. 254–257 (1885).
Thiele et al.: Annalen, vol. 319, pp. 180–196 (1901).